Patented Mar. 27, 1928.

1,663,817

UNITED STATES PATENT OFFICE.

LEOPOLD RUZICKA, OF ZURICH, SWITZERLAND, ASSIGNOR TO M. NAEF & CO., OF GENEVA, SWITZERLAND, A CORPORATION OF SWITZERLAND.

PROCESS FOR THE MANUFACTURE OF FARNESOL.

No Drawing. Application filed March 19, 1924, Serial No. 700,440, and in Switzerland March 22, 1923.

This invention has for its object to provide an improved process for the manufacture of farnesol which is a sesqui-terpenic alcohol contained in a large number of essential oils. According to this improved process suitable acid agents, such as for instance acetic acid anhydride, are caused to react upon nerolidol.

Farnesol may be employed as such as an odoriferous substance, or it may serve as the starting point for the preparation of other perfumes.

Example 1.

1 part of nerolidol is heated with 1½ parts of acetic acid anhydride for 20 hours at a temperature of 120–140° C. After having removed from the product of the reaction the excess of acetic acid and acetic acid anhydride by distillation under reduced pressure or treatment with water, the product is saponified by means of alcoholic potash, and then, after precipitation by means of water and drying, it is heated with 1 part of phthalic acid anhydride at a temperature of 90° C. The phthalic ester of farnesol, precipitated by means of an acid from a solution produced by treating the product of the above described reaction with a dilute solution of caustic soda and after extracting with ether the parts that have not combined with the phthalic acid anhydride, is saponified by heating with an alcoholic or alkaline aqueous solution, and then the resulting farnesol is separated out by distillation.

The transformation of the nerolidol into farnesol may be represented by the following reaction:

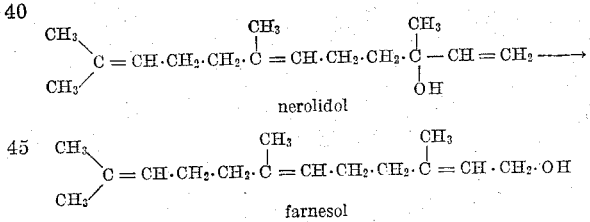

The synthetic farnesol contains not only the alcohol found in muskseed oil but also one or more stereoisomerides.

Farnesol is a colourless oil boiling at 125° C. (0.5 mm.) of $$d_4^{20} = 0.8908 \text{ and } n_D^{20} = 1.4890,$$

having, when diluted, an agreeable and persistent odour of flowers.

Oxidized by chromic acid farnesol yields farnesal which can be converted into a semicarbazone identifiable by its melting point of 133° C. (M. Kerschbaum, Berichte der Deutsch. Chem. Gesell. Vol. 46, page 1732).

The farnesol may also be separated out by direct fractional distillation of the converted and saponified product, instead of isolating it by means of phthalic acid anhydride.

I claim:

1. A process for the manufacture of farnesol consisting in causing acetic acid anhydride to react upon nerolidol.

2. The herein described farnesol, the same being a colourless liquid boiling at 125 degrees centigrade (0.5 mm.), having a density at 20 degrees centigrade with regard to that of water at 4 degrees centigrade, $$d_4^{20} = 0.8908,$$

an index of refraction for line D at 20 degrees centigrade, $$n_D^{20} = 1.4890,$$

and having in the diluted state an agreeable and persistent odour of flowers, and identifiable by its conversion into semi-carbazone of farnesal melting at 133 degrees centigrade.

In testimony whereof I have affixed my signature.

LEOPOLD RUZICKA.